(12) United States Patent
Kuroda

(10) Patent No.: US 8,446,594 B2
(45) Date of Patent: May 21, 2013

(54) POSITION DETECTION DEVICE

(75) Inventor: Akihiro Kuroda, Isehara (JP)

(73) Assignee: Mori Seiki & Co., Ltd., Nara (JP)

( * ) Notice: Subject to any disclaimer, the term of this patent is extended or adjusted under 35 U.S.C. 154(b) by 103 days.

(21) Appl. No.: 13/118,106

(22) Filed: May 27, 2011

(65) Prior Publication Data

US 2011/0310397 A1 Dec. 22, 2011

(30) Foreign Application Priority Data

Jun. 17, 2010 (JP) ................. P2010-138663

(51) Int. Cl.
*G01B 11/02* (2006.01)
(52) U.S. Cl.
USPC ........................................... 356/499
(58) Field of Classification Search
USPC .............. 356/499, 488, 494, 521, 572, 566
See application file for complete search history.

(56) References Cited

U.S. PATENT DOCUMENTS

| | | | |
|---|---|---|---|
| 6,771,377 B2 * | 8/2004 | Jones et al. | 356/616 |
| 7,480,060 B2 * | 1/2009 | Goldman | 356/521 |
| 2008/0158570 A1 * | 7/2008 | Gollier et al. | 356/521 |

* cited by examiner

*Primary Examiner* — Gregory J Toatley
*Assistant Examiner* — Shawn Decenzo
(74) *Attorney, Agent, or Firm* — Haverstock & Owens LLP

(57) ABSTRACT

A position detection device in which 2nd-order or higher order diffracted light as well as stray light is suppressed from being generated to improve the S/N ratio of a position detection signal as well as to improve detection accuracy. With a pitch d of a diffraction grating 11, whose grating surface 11a is covered with a protective layer 12 of a refractive index n, and with a wavelength $\lambda_0$ in vacuum of coherent light illuminated, $d<2\lambda_0/n$ is set. An angle of incidence $\theta_0$ of the coherent light on the diffraction grating 11 is set to satisfy the following relationship: $|\sin \theta_0|<(2\lambda_0/dn)-1$. The 1st order diffracted light is used for position detection.

2 Claims, 4 Drawing Sheets

POSITION DETECTION DEVICE

BACKGROUND OF THE INVENTION

1. Field of the Invention

This invention relates to a position detection device in which a position of an object is detected by changes in the phase of light caused by movement of a diffraction grating.

2. Description of Related Art

As an optical displacement measurement device for detecting the position of relative movement of a mobile part of, for example, a machine tool or a semiconductor manufacturing device, there is known such device configuration exploiting a grating interferometer. This device configuration detects the displacement of a diffraction grating position, as recorded on a movable scale, by taking advantage of light interference.

The present inventors already proposed in, for example, Patent Publication 1, an optical displacement measurement device which, by superimposing two diffracted light beams, which are to interfere with each other, is capable of detecting the position of movement of a movable part to high resolution and high accuracy.

In the technique disclosed in this Patent Publication 1, a coherent light beam forms an optical image on a grating surface of a diffraction grating by a first image-forming means. A first diffracted light beam is collimated by a second image-forming means and illuminated on a reflector of a reflection optical system in a perpendicular direction at all times. With such configuration, the first diffracted light beam as reflected retraces the optical path it followed as the incident light, with there being no change in the optical image forming position on the grating surface of the diffraction grating. On the other hand, the optical axis of a second diffracted light beam, generated by diffraction of the first diffracted light beam, is not offset, while there is no change in the optical path length. In this manner, there is no deterioration in the interference signal for detection even in case the diffraction grating has moved in a direction other than the direction parallel to the grating vector, for example, in case the diffraction grating has become tilted or is suffering from distortions.

In an optical scale for a grating interferometer that detects changes in the light phase caused by movement of the diffraction grating, in order to effect position detection, fingerprints or impurities tend to be affixed to the scale, or the scale may be grazed, if the diffraction grating is exposed to air. Hence, in Patent Publication 2, for example, a transparent protective layer is formed on the surface of the diffraction grating to cover it to protect the surface of the diffraction grating from contamination or grazing.

PUBLICATIONS OF RELATED ART

Patent Publications

[Patent Publication 1] Japanese Laid-Open Patent Publication 2000-81308
[Patent Publication 2] Japanese Laid-Open Patent Publication Hei 5-232318

SUMMARY OF THE INVENTION

Problems to be Solved by the Invention

In the technique disclosed in the above Patent Publications 1, it is made possible to prevent the 0th order light from intruding into the optical path by setting the angle of incidence so as not to be equal to the angle of diffraction. There are, however, cases where higher order diffracted light is generated, depending on conditions. Such higher order diffracted light may turn out to be stray light due to reflection on, for example, a boundary surface of the protective layer of the diffraction grating. The so generated stray light may be intruded into the optical path to deteriorate detection accuracy.

To prevent reflection of the higher order diffracted light on the boundary surface of the protective layer to turn out to be stray light, it may be contemplated to form an antireflection coating on the surface of the protective layer. It is however difficult to provide a structure in which it is possible to prevent reflection of the higher order diffracted light in its entirety.

In view of the above depicted problems of the related art, it is desirable to provide an optical scale for a grating interferometer in which the 2nd order or higher order diffracted light and stray light are suppressed from being generated to improve the S/N ratio of the position detection signal.

Other advantages of the present invention will become more apparent from the following description of a preferred embodiment of the invention.

Means to Solve the Problem

It is supposed that a coherent light beam La with a wavelength $\lambda_0$ is incident via a medium 2 of the refractive index n on a diffraction grating 1 at an angle of incidence $\theta_0$ as shown in FIG. 1. The angle of incidence $\theta_0$ is an angle a normal line drawn to a surface of the diffraction grating 1 makes with the light beam. It is also supposed that the plus-direction of the angle of incidence $\theta_0$ and that of the angle of diffraction $\theta$ are taken as indicated in FIG. 1. The pitch of the diffraction grating 1 is labeled d and the number of the orders of diffraction is labeled m. Then, a plurality of diffracted light beams of respective orders of diffraction, in which the angle of incidence $\theta_0$ and the angle of diffraction $\theta$ satisfy the following equation (1):

$$\sin\theta = (m\lambda_0/dn) - \sin\theta_0 \qquad (1)$$

are generated.

However, if, in the above equation (1), the angle of incidence $\theta_0$ satisfies the conditions of the following equations:

$$(2\lambda_0/dn) - \sin\theta_0 > 1, \text{ and}$$

$$(-2\lambda_0/dn) - \sin\theta_0 < -1$$

then ±2nd order or high order diffracted light is not generated.

Thus, according to the present invention, the angle of incidence $\theta_0$ of a coherent light beam La on the diffraction grating is set so as to satisfy the following relationships:

$$d < 2\lambda_0/n, \text{ and}$$

$$|\sin\theta_0| < 2\lambda_0/(dn) - 1 \qquad (2)$$

whereby it is possible to suppress the ±2nd order or higher order diffracted light from being generated.

A position detection device according to the present invention detects a position by detecting changes in the phase of light caused by movement of a diffraction grating, and includes a protective layer with a refractive index n formed to cover a surface of the position detection device carrying the diffraction grating. With a wavelength of coherent light in vacuum being $\lambda_0$ and with a pitch of the diffraction grating being d, $d < 2\lambda_0/n$ is set. An angle of incidence $\theta_0$ of the coherent light on the diffraction grating is set to satisfy the relationship $|\sin\theta_0| < (2\lambda_0/dn) - 1$, and the 1st order diffracted light is used for position detection.

Another position detection device according to the present invention detects a position by detecting changes in the phase of light caused by movement of a diffraction grating, and includes a protective layer with a refractive index n formed to cover a surface of the diffraction grating. With a wavelength of coherent light in vacuum being $\lambda_0$ and with a pitch of the diffraction grating being d, $d<3\lambda_0/2n$ is set. An angle of incidence $\theta_0$ of the coherent light to the diffraction grating is set to satisfy the relationship $1-(\lambda_0/dn)<|\sin \theta_0|<(2\lambda_0/dn)-1$. The 1st order light by the diffraction grating is returned via a reflection optical system so as to be re-incident on and re-diffracted by the diffraction grating to produce a 1-st order re-diffracted light which is used for position detection.

Effect of the Invention

According to the present invention, with the pitch of the diffraction grating being d and with the refractive index of the protective layer being n, the relationship $d<2\lambda_0/n$ is satisfied, and the angle of incidence $\theta_0$ of the coherent light on the diffraction grating is set to satisfy the relationship $|\sin \theta_0|<(2\lambda_0/dn)-1$. Higher order diffracted light, unnecessary for position detection, may be prevented from being generated as a result of using the 1st order diffracted light for position detection. It is also possible to suppress stray light derived from unneeded diffracted light generated by reflection on the boundary surface of the protective layer with the refractive index n deposited on the surface of the diffraction grating, thereby suppressing intrusion of stray light into the position detection light.

In addition, the relationship $d<3\lambda_0/2n$ is satisfied, and the angle of incidence $\theta_0$ of the coherent light on the diffraction grating is set to satisfy the relationship $1-(\lambda_0/dn)<\sin \theta_0<(2\lambda_0/dn)-1$. In this case, the 1st order light by the diffraction grating is returned via a reflection optical system so as to be re-incident on and re-diffracted by the diffraction grating to produce a 1-st order re-diffracted light which is used for position detection. For the re-incident and re-diffracted 1st order diffracted light, higher order diffracted light not used for position detection may similarly be prevented from being generated. It is thus possible to prevent generation of stray light derived from unneeded diffracted light caused by reflection on the boundary surface of the protective layer with the refractive index n, thereby prohibiting intrusion of stray light into the position detection light.

Thus, according to the present invention, there may be provided a position detection device in which 2nd order or higher order diffracted light and stray light may be suppressed from being generated to improve the S/N ratio of the position detection signal as well as to improve position detection accuracy.

DESCRIPTION OF THE PREFERRED EMBODIMENTS

An embodiment of the present invention will now be described in detail with reference to the drawings.

Figure 1:
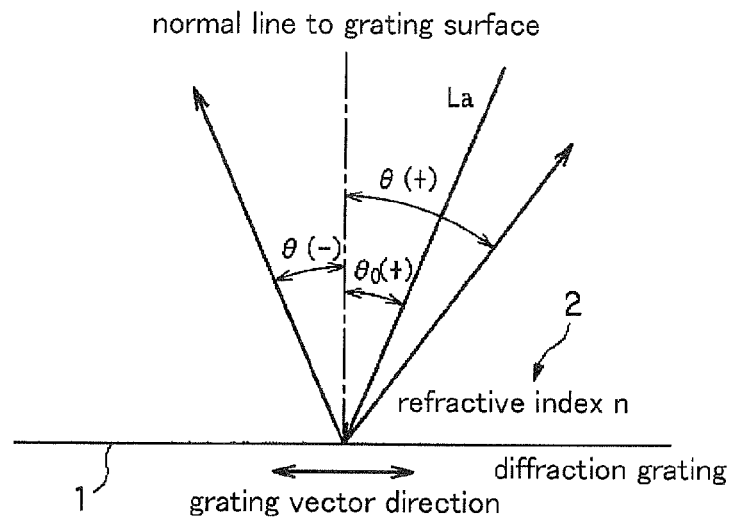
FIG. 1 is a schematic view showing how diffracted light is generated by a diffraction grating.
Figure 2:
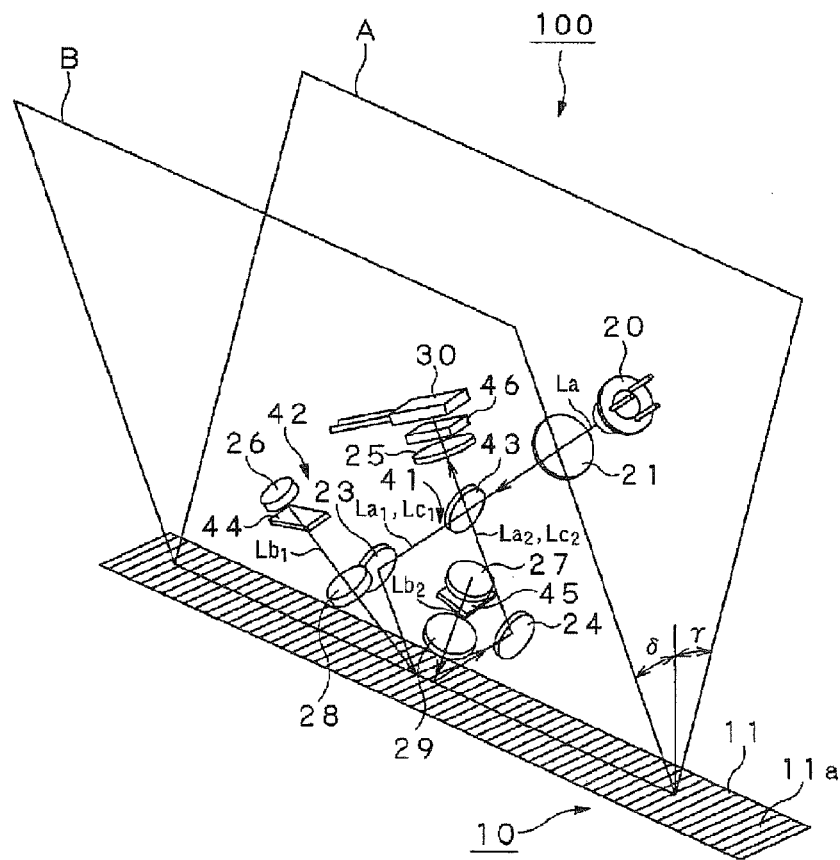
FIG. 2 is a schematic perspective view showing a configuration of an optical displacement measurement device according to the present invention.

The present invention is applied to an optical displacement detection device 100 shown for example in FIG. 2.

This optical displacement detection device 100, including an optical scale 10, carrying thereon a reflection configuration diffraction grating 11, is a device that detects a position of a moving part of, for example, a machine tool.

Figure 3:
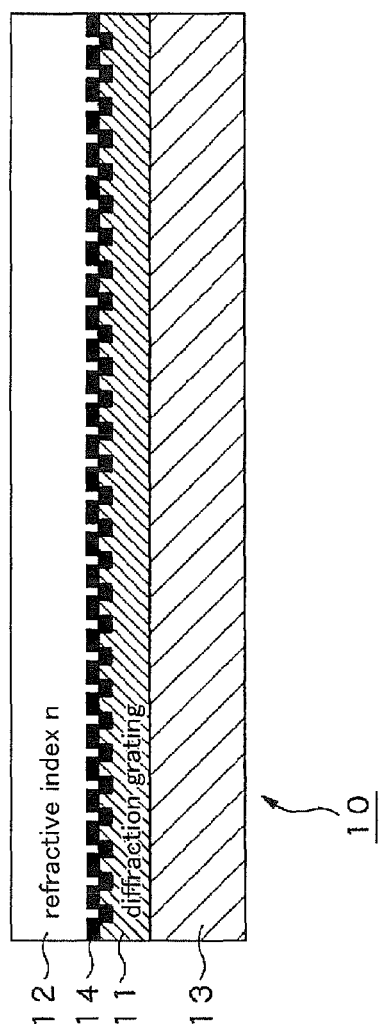
FIG. 3 is a schematic cross-sectional view showing a structure of an optical scale as used for the optical displacement measurement device.

Referring to FIG. 3, the optical scale 10 is for a grating interferometer that detects a position of an object by detecting phase changes of light caused by movement of the diffraction grating 11. The optical scale includes a protective layer 12 of a reflective index of n that covers the surface of the scale on which the diffraction grating 11 has been formed. With the wavelength 7 of light in vacuum and with the pitch d of the diffraction grating 11, $d<2\lambda_0/n$ is set. An angle of incidence $\theta_0$ of a coherent light beam on the diffraction grating 11 is set to satisfy the relationship $|\sin \theta_0|<(2\lambda_0/dn)-1$, or the pitch d of the diffraction grating 11 is set to satisfy the relationship $d<3\lambda0/2n$. The angle of incidence $\theta_0$ of the coherent light beam on the diffraction grating 11 is set to satisfy the relationship $1-(\lambda_0/dn)<\sin \theta_0<(2\lambda_0/dn)-1$. The 1st order diffracted light by the diffraction grating 11 is returned via a reflection optical system so as to be re-incident on the diffraction grating 11. This 1st order diffracted light, diffracted a second time by the diffraction grating 11, is used for position detection.

The optical scale 10 is a reflection configuration scale, and has a base substrate 13 of glass or ceramics on which the diffraction grating 11 presenting physical crests/grooves is formed. A reflective coating 14 is formed on the surface of the diffraction grating 11, and the above mentioned protective layer 12 is formed thereon.

Referring to FIG. 2, the optical displacement detection device 100 includes a virtual inclined reference plane A and another virtual inclined plane B. The virtual inclined plane A is inclined at an angle γ relative to a virtual reference plane that is parallel to a normal line vector and that includes a virtual straight line running parallel to the direction of a grating vector on a grating surface 11a of the diffraction grating 11. The virtual inclined plane A also includes the virtual straight line. The virtual inclined plane B is inclined at an angle 6 relative to the virtual reference plane and also includes the virtual straight line. The inclined surfaces A and B are to be on the same side of the grating surface 11a of the diffraction grating 11.

Figure 4:
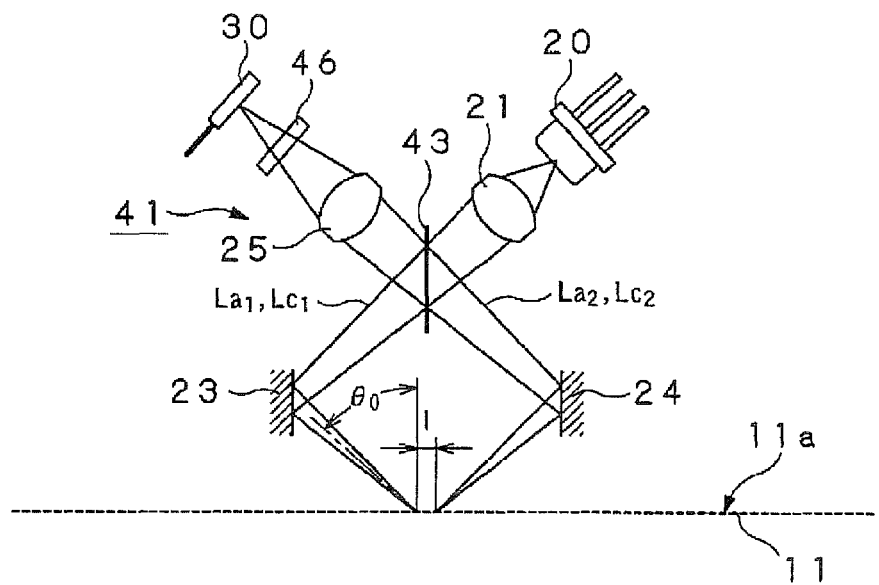
FIG. 4 is a schematic side view showing component elements of the optical displacement measurement device, arranged on an inclined plane A, as seen from a direction perpendicular to the inclined plane A.
Figure 5:
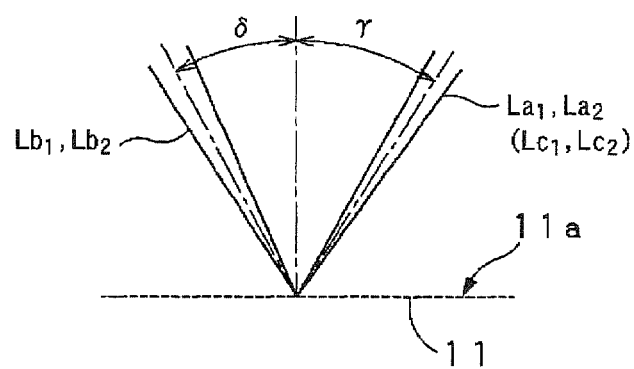
FIG. 5 is a schematic side view of coherent light incident on a diffraction grating of the optical displacement measurement device, and the diffracted light from the diffraction grating, as seen from the direction of the grating vector.
Figure 6:
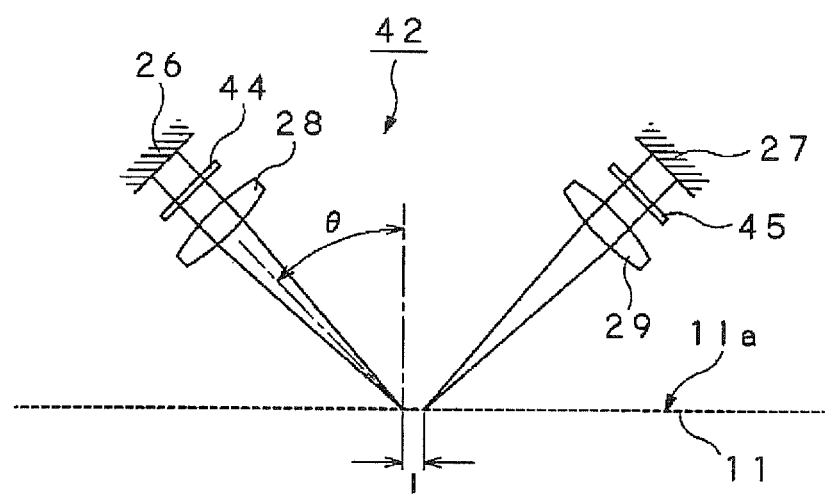
FIG. 6 is a schematic side view showing component elements of the optical displacement measurement device, arranged on an inclined plane B, as seen from a direction perpendicular to the inclined plane B.

FIG. 4 depicts a side view, looking from a direction normal to the inclined plane A, of component elements in this optical displacement detection device 100 which are arranged on the inclined plane A. FIG. 5 shows a coherent light beam incident on the diffraction grating 11, and a light beam diffracted by the diffraction grating 11, when looking from the grating vector direction. FIG. 6 depicts a side view, looking from a direction normal to the inclined plane B, of component elements arranged on the inclined plane B.

Referring to FIGS. 2 and 4, the optical displacement detection device 100 includes a coherent light source 20, radiating a coherent light beam La, a light receiving element 30 and an illumination/light receiving optical system 41. The light receiving element 30 receives two light beams Lc1, Lc2, which interfered with each other, to generate an interfering light beam. The illumination/light receiving optical system 41 splits the coherent light beam La into two coherent light beams La1, La2 which are then illuminated on the diffraction grating 11. The illumination/light receiving optical system 41 superposes together the light beams Lc1, Lc2 coming from the diffraction grating 11 after diffraction twice. These superposed light beams are then illuminated on the light receiving element 30.

The illumination/light receiving optical system 41 includes a first image-forming element 21 that forms an optical image of the coherent light beam La, radiated from the coherent light source 20, on the grating surface 11a of the diffraction grating 11. The illumination/light receiving optical system 41 also includes a polarization beam splitter 43 that splits the coherent light beam La, radiated from the coherent light source 20, into two coherent light beams La1, La2 having the directions of light polarization perpendicular to each other. The illumination/light receiving optical system 41 also includes a reflector 23 that reflects one La1 of the coherent light beams as split by the polarization beam splitter 43 and that also reflects the light beam Lc1 coming from the diffraction grating 11 after diffraction twice. The illumination/light receiving optical system 41 also includes a reflector 24 that reflects the other La2 of the coherent light beams as split by the polarization beam splitter 43 and that also reflects the light beam Lc2 coming from the diffraction grating 11 after diffraction twice. The illumination/light receiving optical system 41 also includes a second image-forming element 25 that forms optical images of the two twice-diffracted light beams Lc1, Lc2, having the directions of light polarization perpendicular to each other and superposed together by the polarization beam splitter 43, on an image-forming surface 30a of the light receiving element 30. The illumination/light receiving optical system 41 further includes a polarizer 46 that take out components of the same direction of light polarization of the twice-diffracted two light beams Lc1, Lc2 superposed together by the polarization beam splitter 43 and having the directions of light polarization perpendicular to each other.

In the illumination/light receiving optical system 41, respective components are arranged so that optical paths for the coherent light beams La (La1, La2) transmitted through the optical system and the optical paths for the light beams Lc1, Lc2 after diffraction twice will be formed on the inclined plane A. Hence, the angle of incidence as well as the angle of diffraction of the coherent light beams La1, La2 and the twice-diffracted light beams Lc1, Lc2, as seen from the direction of the grating vector, is γ, as shown in FIG. 5.

The coherent light beam La, radiated from the coherent light source 20, is incident on the polarization beam splitter 43 of the illumination/light receiving optical system 41 as its direction of light polarization is tilted by 45° to the polarization beam splitter 43.

The polarization beam splitter 43 splits the incident coherent light beam La into two coherent light beams La1, La2 whose directions of light polarization are perpendicular to each other. The coherent light beam La1, transmitted through the polarization beam splitter 43 of the illumination/light receiving optical system 41, proves to be a P-polarized light beam, while the coherent light beam La2, reflected thereby, proves to be the S-polarized light beam.

On the polarization beam splitter 43 are incident the light beams Lc1, Lc2 coming from the diffraction grating 11 after diffraction twice. Meanwhile, the twice-diffracted light beam Lc1, inherently a P-polarized light beam, has its direction of light polarization rotated by 90° by a reflection optical system 42, as later explained, to prove to be an S-polarized light. Similarly, the twice-diffracted light beam Lc2, inherently an S-polarized light beam, has its direction of light polarization rotated by 90° by the reflection optical system 42 to prove to be a P-polarized light. Hence, the polarization beam splitter 43 reflects the twice-diffracted light beam Lc1, which is an S-polarized light beam, while transmitting the twice-diffracted light beam Lc2, which is a P-polarized light beam, in such a manner that these two twice-diffracted light beams Lc1, Lc2 are superposed together.

The reflector 23 reflects the coherent light beam La1, transmitted through the polarization beam splitter 43, such as to illuminate the light beam on a preset site on the grating surface 11a of the diffraction grating 11. The reflector 23 also reflects the twice-diffracted light beam Lc1 from the diffraction grating 11 to illuminate the so reflected light beam on the polarization beam splitter 43.

The reflector 24 reflects the coherent light beam La2, reflected by the polarization beam splitter 43, onto a preset site of the grating surface 11a of the diffraction grating 11. The reflector 24 also reflects the twice-diffracted light beam LC2 to illuminate it on the polarization beam splitter 43.

The reflectors 23, 24 illuminate the coherent light beams La1, La2 onto the preset site of the grating surface 11a so that the angle of incidence on the inclined plane A will be $\theta_0$. It is observed that the reflectors 23, 24 are arranged so that their reflecting surfaces will face each other. Hence, the directions of light incidence in the grating vector direction of the coherent light beams La1, La2 are opposite to each other. The coherent light beams La1, La2 from the reflectors 23, 24 are incident on the sites of the diffraction grating which are spaced apart from each other a preset distance along the grating vector. The distance between the point of incidence of the coherent light beam La1 and that of the coherent light beam La2 is 1, where 1 denotes an optional distance not less than 0.

The polarizer 46 is passed through by the twice-diffracted light beam Lc1, an S-polarized light beam, and the twice-diffracted light beam Lc2, a P-polarized light beam, superposed on the light beam Lc1 by the polarization beam splitter 43. The polarizer 46 transmits components of the twice-diffracted light beams Lc1, Lc2, having the directions of light polarization of 45°, such as to provide a light beam of the same direction of light polarization.

The light receiving element 30 receives the two twice-diffracted light beams Lc1, Lc2 transmitted through the polarizer 46.

In the optical displacement detection device 100, the coherent light beam La1 is incident on the diffraction grating 11 and thereby diffracted to produce a once-diffracted light beam Lb1. Also, the coherent light beam La2 is incident on the diffraction grating 11 and thereby diffracted to produce a once-diffracted light beam Lb2. The angle of diffraction of the once-diffracted light beam Lb1 and that of the once-diffracted light beam Lb2 in the direction of the grating vector are δ, as shown in FIG. 5. Viz., the once-diffracted light beams Lb1, Lb2 are generated along the inclined plane B. The angle of diffraction on the inclined plane B of each of the once-diffracted light beams Lb1, Lb2 is θ. It is observed that the outgoing direction along the direction of the grating vector of the once-diffracted light beam Lb1 is opposite to that of the once-diffracted light beam Lb2.

The optical displacement detection device 100 includes the reflection optical system 42, as shown in FIGS. 2 and 6.

The reflection optical system 42 includes a reflector 26 that reflects the once-diffracted light beam Lb1, generated from the coherent light beam La1, such as to illuminate it again on the diffraction grating 11. The reflection optical system 42 also includes a reflector 27 that reflects the once-diffracted light beam Lb2, generated from the coherent light beam La2, to illuminate the reflected light beam again on the diffraction grating 11. The reflection optical system 42 also includes a third image-forming element 28 that collimates the once-diffracted light beam, generated from the coherent light beam La1, to illuminate the resulting collimated light beam on the reflector 26. The reflection optical system 42 also includes a fourth image-forming element 29 that collimates the once-diffracted light beam Lb2, generated from the coherent light beam La2, to illuminate the resulting collimated light beam on the reflector 27. The reflection optical system 42 further includes a quarter wave plate 44 provided on the optical path of the once-diffracted light beam Lb1, and another quarter wave plate 45 provided on the optical path of the once-diffracted light beam Lb2.

In the reflection optical system 42, the angle of diffraction of each of the two once-diffracted light beams Lb1, Lb2, as seen from the grating vector direction, is δ, as previously mentioned. Hence, the components are arranged so that optical paths of the once-diffracted light beam Lb1 and the once-diffracted light beam Lb2 being transmitted will be formed on the inclined plane B. In addition, the reflectors 26, 27 of the reflection optical system 42 are arranged so that they will reflect the once-diffracted light beams Lb1, Lb2, diffracted at the angle of diffraction θ on the inclined plane B, in a perpendicular direction.

The quarter wave plate 44 is arranged with its optical axis tilted 45° relative to the direction of light polarization of the once-diffracted light beam Lb1 of the P-polarized light beam incident from the diffraction grating 11. The once-diffracted light beam Lb1 traverses the quarter wave plate 44 twice so as to form an optical image on the diffraction grating 11. Hence, the once-diffracted light beam Lb1, which has been the P-polarized light beam, is turned into an S-polarized light beam, which is illuminated on the diffraction grating 11.

The quarter wave plate 45 is arranged with its optical axis tilted 45° relative to the direction of light polarization of the once-diffracted light beam Lb2 of the S-polarized light beam incident from the diffraction grating 11. The once-diffracted light beam Lb2 traverses the quarter wave plate 45 twice so as to form an optical image on the diffraction grating 11. Hence, the once-diffracted light beam Lb2, which has been the S-polarized light beam, is turned into a P-polarized light beam which is illuminated on the diffraction grating 11.

The once-diffracted light beams Lb1, Lb2 are incident from the reflection optical system 42 on the diffraction grating 11. Like the angle of diffraction of the once-diffracted light beams Lb1, Lb2, the angle of incidence of the once-diffracted light beams Lb1, Lb2, as seen from the direction of the grating vector, is δ. Similarly, like the diffraction angle, the angle of incidence on the inclined surface B is θ.

The twice-diffracted light beams Lc1, Lc2 are generated by diffraction of the once-diffracted light beams Lb1, Lb2. Like the incidence angle of the coherent light beams La1, La2, the diffraction angle of the twice-diffracted light beams Lc1, Lc2, as seen from the direction of the grating vector, is γ. Also, like the angle of incidence of the coherent light beams La1, La2, the diffraction angle on the inclined surface A is $θ_0$.

Hence, the twice-diffracted light beams Lc1, Lc2 travel on the same optical path as that of the coherent light beams La1, La2 in the reverse direction to fall on the polarization beam splitter 43.

The optical displacement detection device 100 also includes a position detection unit, not shown, for detecting the position of movement of the diffraction grating 11 based on an interference signal from the light receiving element 30.

In the present optical displacement detection device 100, the illumination/light receiving optical system 41 is arranged on the inclined plane A inclined at a preset tilt angle relative to the virtual reference plane. The reflection optical system 42 is mounted on the inclined plane B. Hence, the optical path of the coherent light beam may be separated from that of the diffracted light beam to increase the degree of freedom in device implementation. The diffracted light beams Lb1, Lb2 may be caused to interfere with each other, as intrusion of the 0th order diffracted light beam or the reflected light beam into the illumination/light receiving optical system 41 or the reflection optical system 42 is refused, thus assuring position measurement to high accuracy.

Viz., in the present optical displacement detection device 100, the coherent light La, radiated from the coherent light source 20, traverses the first image-forming element 21, and is split by the polarization beam splitter 43 into two coherent light beams La1, La2, viz., the transmission side P-polarized light beam and the reflection side S-polarized light beam. It is observed that, in case the coherent light beam is a semiconductor laser beam, the coherent light beam may be made to fall on the polarization beam splitter 43 as its direction of light polarization is inclined 45° relative to the polarization beam splitter 43. The two as-split coherent light beams La1, La2 are reflected by the reflectors 23, 24, respectively, such as to form optical images at substantially the same point in the vicinity of the grating surface 11a of the reflection configuration diffraction grating 11. It is necessary for the beam of the optical image to be of a width (diameter) to encompass a sufficient number of grating lines to generate the diffracted light. On the other hand, the beam diameter is to be greater than scores of μm to avoid the effects of contaminants or grazes. An optimum beam diameter may be found by adjusting e.g., the numerical aperture of the image-forming optical system.

The angle of incidence to the diffraction grating 11 is $θ_0$. A plurality of light beams refracted by the diffraction grating 11 at an angle θ traverse the third image-forming element 28 having a focus in the vicinity of the grating surface 11a of the diffraction grating 11. The light beams then traverse the quarter wave plate 44, whose optical axis is inclined 45° relative to the direction of light polarization of the light beams, so as to be then reflected by the reflector 26 placed at right angles to the optical axis. The light beams then re-traverse the quarter wave plate 44 where the P-polarized light beams are turned into S-polarized light beams and the S-polarized light beams are turned into P-polarized light beams. The resulting light beams then traverse the third image-forming element 28 to form an optical image in the vicinity of the grating surface 11a of the diffraction grating 11. The light beams diffracted by the diffraction grating 11 retrace the path the light beams followed as the incident light, in the return direction, that is, from the reflector 24 back towards the polarization beam splitter 43.

The polarization beam splitter 43 transmits the P-polarized light beam, while reflecting the S-polarized light beam. Hence, the two coherent light beams La1, La2 are superposed together to travel towards the second image-forming element 25. The light beams, transmitted through the second image-forming element 25, traverse the polarizer 46 whose axis of light transmission is inclined 45° relative to the direction of light polarization. An optical image is thus formed in the vicinity of the light receiving surface 30a of the light receiving element 30.

Let the values of the amplitude of the two twice-diffracted light beams Lc1, Lc2, superposed together, be $A_1$, $A_2$, and let the displacement of the diffraction grating 11 in the direction of the grating vector be x. Also, let the initial phase be δ. The amplitude I of an interference signal, obtained by the light receiving element 30, may be detected by the following equation (3):

$$I = A_1^2 + A_2^2 + 2A_1 A_2 \cos(4Kx + δ) \quad (3)$$

where
K=2π/d, d being the grating pitch. A position detection unit may thus detect the position of movement of the diffraction grating 11 based on the interference signal from the light receiving element 30.

In the above described configuration of the optical displacement detection device 100, the diffraction grating 11 is moved in the direction of the grating vector in an amount corresponding to the movement of the movable member, thereby producing a phase difference between the two twice-diffracted light beams Lc1, Lc2. In the optical displacement detection device 100, these two twice-diffracted light beams Lc1, Lc2 are made to interfere with each other to detect an interference signal. From the so detected interference signal, the phase difference between the two twice-diffracted light beams Lc1, Lc2 is found to detect the position of movement of the diffraction grating 11.

In this manner, the coherent light beams La1, La2 are made to form optical images in the vicinity of the grating surface 11a, and the light beams traverse the image-forming elements each having a focus in the vicinity of the grating surface 11a. The light beams are then reflected by the reflectors 26, 27. Thus, even if the diffraction grating 11 has tilted, the first diffracted light beam is incident on the reflectors 26, 27 at right angles thereto at all times. Hence, the reflected light beams re-trace the optical path along which the light beam traveled as the incident light beams. There is no risk of variations in the interference signal because the optical path of the twice-diffracted light beam is not offset.

The inclined plane A, within which the coherent light source 20 and the light receiving element 30 are disposed, is inclined at the angle $\gamma$ relative to the grating surface 11a, while the inclined plane B, within which the reflectors 26, 27 are disposed, is inclined at the angle $\delta$ relative to the grating surface 11a. The left and right optical paths are symmetrically arranged. The positions of the reflectors 26, 27 are adjusted so that the optical path lengths of the left and right optical paths will be equal to each other.

This may prevent measurement errors from being produced due to variations in wavelengths. To allow for such adjustment, the coherent light source 20 with a short coherence length may be used. For example, if a multi-mode semiconductor laser with the coherence length of hundreds of μm is used, it is sufficient to adjust the positions of the reflectors 26, 27 so that the modulation depth (visibility) of the interference fringes will be of a maximum value. By so doing, the optical path length difference may be suppressed to lower than scores of μm.

In this optical displacement detection device 100, the 1st order diffracted light is used, and hence the angle $\theta_0$, $\theta$, $\gamma$ and $\delta$ may be represented by the following equations:

$\sin \theta = (\lambda_0/dn) = \sin \theta_0$ $\sin \gamma / \sin \delta = \cos \theta / \cos \theta_0$ where $\theta_0$ and $\theta$ denote values on the planes A and B, respectively.

The optical scale 10 of the present optical displacement detection device 100 is for a grating interferometer that detects a position by detecting changes in the phase of light caused by movement of the diffraction grating 11, as mentioned previously. The position detection device includes a protective layer 12 with a refractive index n formed to cover a surface of the position detection device carrying the diffraction grating. With a wavelength of coherent light in vacuum being $\lambda_0$ and with a pitch of the diffraction grating being d, $d<2\lambda_0/n$ is set. An angle of incidence $\theta_0$ of the coherent light on the diffraction grating 11 is set to satisfy the relationship:

$|\sin \theta_0| < (2\lambda_0/dn) - 1$.

Hence, ±2nd order or higher order diffracted light may be not allowed to be generated at the time of the first diffraction.

It is observed that in the present optical displacement detection device 100, the 1st order diffracted light, generated by the diffraction grating 11, is caused to be incident at the same angle again and re-diffracted, and the 1st order diffracted light, thus produced on diffraction twice, is used. Thus, if simply the incident angle $\theta_0$ of the coherent light on the diffraction grating 11 is set to satisfy the relationship:

$|\sin \theta_0| < (2\lambda_0/dn) - 1$ there is a possibility that, in the course of re-diffraction, referred to above, diffracted light other than the 1st order light is produced.

If the number of orders of diffraction at the time of the second diffraction is $m_2$ and the angle of diffraction is $\theta'$, $\sin \theta' = (m_2 - 1)\lambda_0/dn + \sin \theta_0$ so that the −1st order light for $m_2 = -2$ is such that $\sin \theta' = -2\lambda_0/dn + \sin \theta_0$.

Thus, if sine° satisfies the following relationship:

$|\sin \theta_0| < (2\lambda_0/dn) - 1$ the following relationship:

$-2\lambda_0/dn + \sin \theta_0 < -1$ is valid, there being no solution, such that no −1st order light is generated.

In similar manner, in case the −2nd order light for $m_2 = -2$ satisfies the relationship:

$|\sin \theta_0| < (2\lambda_0/dn) - 1$ the relationship:

$-3\lambda_0/dn + \sin \theta_0 < -1$ holds at all times, such that there is no solution and no −2nd order light is generated.

Moreover, the +2nd order light of $m_2 = +2$ is such that $\sin \theta' = \lambda_0/dn + \sin \theta_0$ so that, even if $\sin \theta_0$ satisfies the following relationship:

$|\sin \theta_0| < (2\lambda_0/dn) - 1$ there may sometimes be a solution. However, in the present optical displacement detection device 100, the pitch d of the diffraction grating 11 is set so that the pitch d of the diffraction grating 11 and the refractive index n of the protective layer 12 will satisfy the relationship:

$d < 3\lambda_0/2n$ and the relationship:

$1 - (\lambda_0/dn) < \sin \theta_0 < (2\lambda_0/dn) - 1$.

It is thus possible to suppress generation of the +2nd order light as well. In this case, the ranges of d and $\theta_0$ become narrower than if a condition that no 2nd order or higher order diffracted light is to be generated only for the first diffraction is used. It is however preferred to use the former two conditions in case there is marked influence by the higher order light generated at the time of the second diffraction. Which of the above alternatives is to be used depends on location constraints in implementation and on to which extent the influence of the higher order light is to be tolerated. If just the 1st diffracted light is used, as in an example disclosed in the Japanese Laid-Open Patent Publication 2000-18917, such a condition in which the second or higher order diffracted light is not to be generated only for the first diffraction suffices.

Viz., in the present optical displacement detection device 100, with the pitch d of the diffraction grating 11, the grating surface 11a of which is covered with the protective layer 12 of the refractive index n, and with the wavelength $\lambda_0$ of coherent light in vacuum, $d<2\lambda_0/n$ is set. The angle of incidence $\theta_0$ of the coherent light on the diffraction grating 11 is set to satisfy the relationship $|\sin \theta_0| < (2\lambda_0/dn) - 1$, and the 1st order diffracted light is used for position detection. By so doing, higher order diffracted light unnecessary for position detection may be suppressed from being generated. Moreover, it is possible to prevent generation of stray light, derived from unneeded diffracted light otherwise produced by reflection on the boundary surface of the protective layer 12 of the refractive index n deposited to cover the grating surface 11a of the diffraction grating 11. It is thus possible to refuse intrusion of the stray light into the position detection light.

Moreover, the pitch of the diffraction grating 11 and the refractive index n of the protective layer may be set to satisfy the relationship $d<3\lambda_0/2n$ and the angle of incidence $\theta_0$ of the coherent light on the diffraction grating is set to satisfy the relationship $1-(\lambda_0/dn)<\sin\theta_0<(2\lambda_0/dn)-1$. The 1st order light by the diffraction grating 11 is returned via the reflection optical system 42 so as to be re-incident on and re-diffracted by the diffraction grating to produce a 1-st order re-diffracted light which is used for position detection. Thus, for the re-incident 1st order light, higher order diffracted light, unneeded for position detection, may be prevented from being generated as well. Since the stray light derived from unneeded diffracted light produced by reflection on the boundary surface of the protective layer 12 with the refractive index n may now be prohibited, it is possible to refuse intrusion of the stray light into the position detection light.

The optical displacement detection device 100, described above, includes the optical scale 10 carrying thereon the reflection configuration diffraction grating 11. Alternatively, the optical displacement detection device may be so arranged and constructed that the illumination/light receiving optical system 41 and the reflection optical system 42 are symmetrically arranged on both sides of a transmission configuration scale not carrying a reflection coating thereon.

Viz., in the above described embodiment of the present invention, the optical displacement detection device 100 is provided with the reflection configuration optical scale 10 including the reflective coating 14 and the protective layer 12 formed thereon. The reflective coating 14 is deposited on the grating surface 11a. However, the present invention is not limited to the formulation including the reflection configuration optical scale, but may also be applied to an optical displacement detection device including a transmission configuration optical scale not provided with a reflective coating.

The optical scale 10, provided on the optical displacement detection device 100, is a linear scale that is elongated in the direction of the grating vector. However, the present invention is not limited just to the optical displacement detection device having the linear scale, and may be applied to the optical displacement detection device having a rotary configuration optical scale.

It should be understood by those skilled in the art that various modifications, combinations, sub-combinations and alterations may occur depending on design requirements and other factors insofar as they are within the scope of the appended claims or the equivalents thereof.

What is claimed is:

1. A position detection device that detects a position by detecting changes in a phase of light caused by movement of a diffraction grating, wherein:
   the position detection device comprises a protective layer with a refractive index n formed to cover a surface of the diffraction grating;
   the diffraction grating is a reflection type, and moves against a light source;
   with a wavelength of coherent light in vacuum being $\lambda_0$ and with a pitch of the diffraction grating being d, $d<2\lambda_0/n$ is set; and wherein
   an angle of incidence $\theta_0$ of the coherent light on the diffraction grating is set to satisfy a relationship:

$|\sin\theta_0|<(2\lambda_0/dn)-1;$ a 1st order diffracted light being used for position detection.

2. A position detection device that detects a position by detecting changes in a phase of light caused by movement of a diffraction grating, wherein:
   the position detection device comprises a protective layer with a refractive index n formed to cover a surface of the diffraction grating;
   the diffraction grating is a reflection type, and moves against a light source;
   with a wavelength of coherent light in vacuum being $k_0$ and with a pitch of the diffraction grating being d, $d<3\lambda_0/2n$ is set; and wherein
   an angle of incidence $\theta_0$ of the coherent light on the diffraction grating is set to satisfy a relationship:

$1-(\lambda_0/dn)<\sin\theta_0<(2\lambda_0/dn)-1;$ a 1st order light by the diffraction grating being returned via a reflection optical system so as to be re-incident on and re-diffracted by the diffraction grating to produce a 1-st order re-diffracted light which is used for position detection.

* * * * *